United States Patent [19]

Boucher

[11] 4,040,064
[45] Aug. 2, 1977

[54] FLUID PRESSURE ACTUATED RECORDER

[76] Inventor: Harry Boucher, P.O. Box 1849, Odessa, Tex. 79760

[21] Appl. No.: 722,640

[22] Filed: Sept. 13, 1976

[51] Int. Cl.² .............................................. G01D 9/02
[52] U.S. Cl. ..................................... 346/72; 346/113; 346/125; 346/138
[58] Field of Search ................. 346/72, 113, 125, 138, 346/33 WL, 33 TP; 73/391

[56] References Cited

U.S. PATENT DOCUMENTS

| 3,198,003 | 8/1965 | Wiseman | 346/136 X |
| 3,521,292 | 7/1970 | Boucher | 346/72 |

Primary Examiner—Joseph W. Hartary
Attorney, Agent, or Firm—Marcus L. Bates

[57] ABSTRACT

A signal actuated recorder device has a recording drum connected to be actuated only when sensing a signal. The recorder is connected to measure the torque employed to make up joints of tubular goods into a string, for example, and can also be used in other applications, such as the testing of joints of pipe.

In making up a string of production tubing, a hydraulic strain gauge assembly is connected to the tubing tongs to measure the magnitude of torque imparted into the tubular goods. The pressure signal from the piston of the gauge actuates a motor of the recorder which advances the drum one increment. At the same time, the pressure signal is utilized to move a scribe in proportion to the magnitude of the signal.

12 Claims, 6 Drawing Figures

FLUID PRESSURE ACTUATED RECORDER

BACKGROUND OF THE INVENTION

There are many instances in drilling and producing oil wells where tubular goods are run downhole into a borehole. The individual joints of tubing, such as drill stem, must be threadedly made up to a specified torque in order to obviate the danger of any one of the multiplicity of joints becoming unthreaded, thereby dropping the lower string to the bottom of the borehole, and bringing about a condition which is considered a catastrophe in the oilfield. Several hours may be expended in making up a string of drill pipe, and for this reason, it is difficult to be able to subsequently determine or verify the precise torque applied to any of the hundreds of individual connections. Therefore, it is desirable to be able to provide a recorder device which accurately measures and records the magnitude of the torque applied to each of the connections; and furthermore, to be able to store this data on a minimum of recording or chart paper so as to be able to subsequently determine the torqued condition of any individual joint.

Furthermore, it is desirable to have made available a recorder which uses a minimum of chart paper and which includes a power source derived from the signal so that no attention is required, such as the winding of a clock or the provision of electric motors and the like.

It would furthermore be desirable that such a recording device be simple in operation, low in cost, easy to maintain, a foolproof in operation.

THE PRIOR ART

Boucher — U.S. Pat. No. 3,842,507.

SUMMARY OF THE INVENTION

This invention relates to recording apparatus and specifically to a recorder apparatus connected to be actuated only when receiving a signal. The apparatus comprises a chart means and a scribe means positioned to place indicia on said chart means upon relative movement between the chart and the scribe.

A first pressure responsive device is connected to move the scribe in one direction respective to the chart with the magnitude of movement being proportional to the magnitude of pressure effected upon the pressure responsive means.

A second pressure responsive means is connected to move the chart in another direction relative to the scribe with the magnitude of movement being constant for each pressure signal received. The chart advances one increment for each cycle of the scribe. Hence, the scribe means moves relative to the chart to record the magnitude of pressure and thereafter the chart advances one increment of movement so that each of a plurality of resulting curves are distinct from one another.

Accordingly, a primary object of the present invention is the provision of a recorder device which is actuated during a time interval that a signal is being generated.

A further object of the invention is the provision of a recording device for measuring the number of joints of pipe connections made and the torque effected on each individual connection.

A still further object of this invention is the provison of a recording apparatus which first measures the magnitude of a signal and thereafter advances one increment of movement, thereby separating the indicia between each measurement.

A still further object of this invention is to disclose and provide apparatus which continually monitors a varying pressure signal, and which records the magnitude and number of signals, and which is actuated only when the signal increases a predetermined amount.

Another and still further object of this invention is the provision of a means by which the torque applied to each individual joint of a string of tubular goods is individually measured to subsequently enable the applied torque to be determined.

These and other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
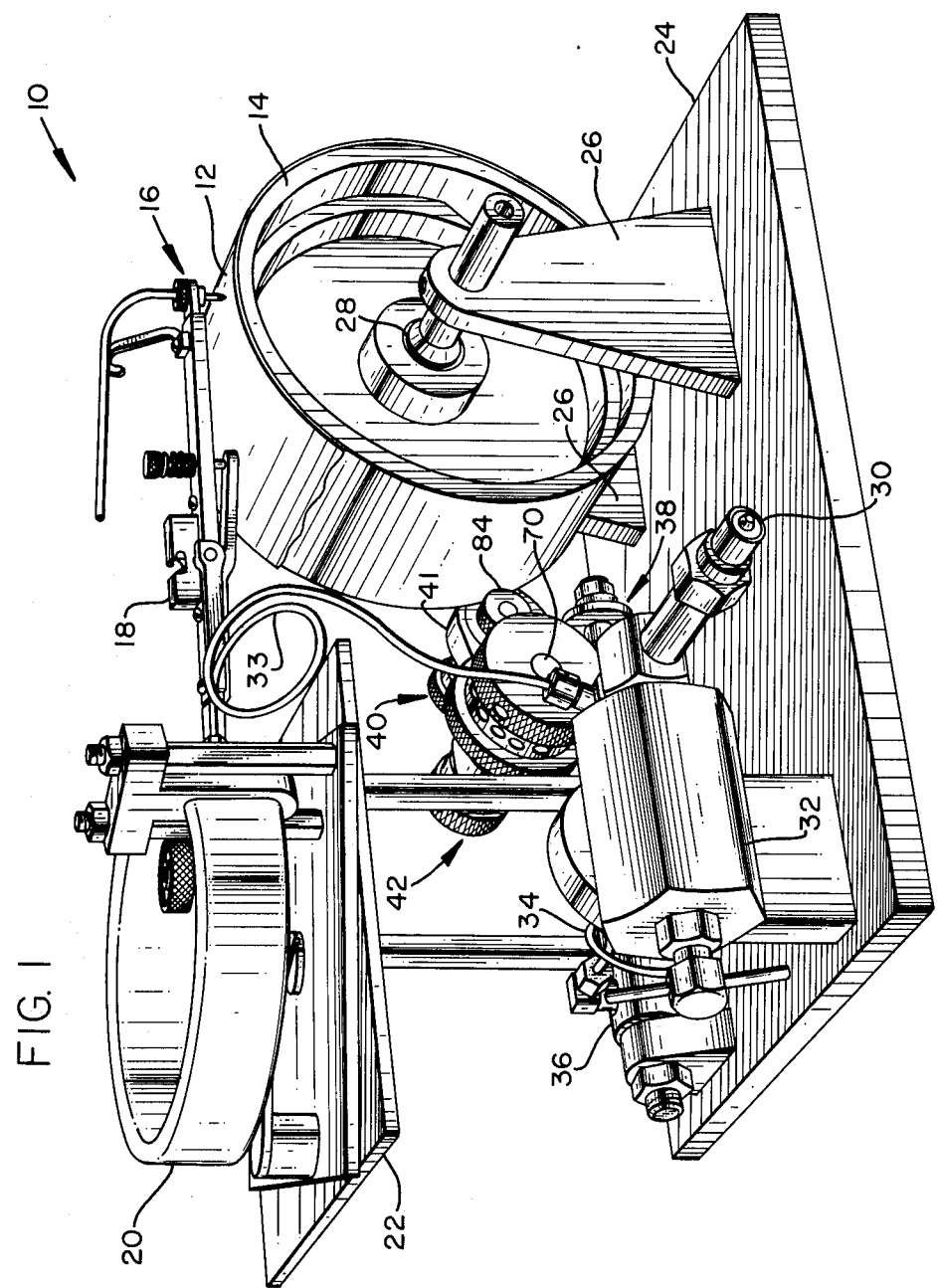
FIG. 1 is a perspective view of a recorder apparatus made in accordance with the present invention.
Figure 2:
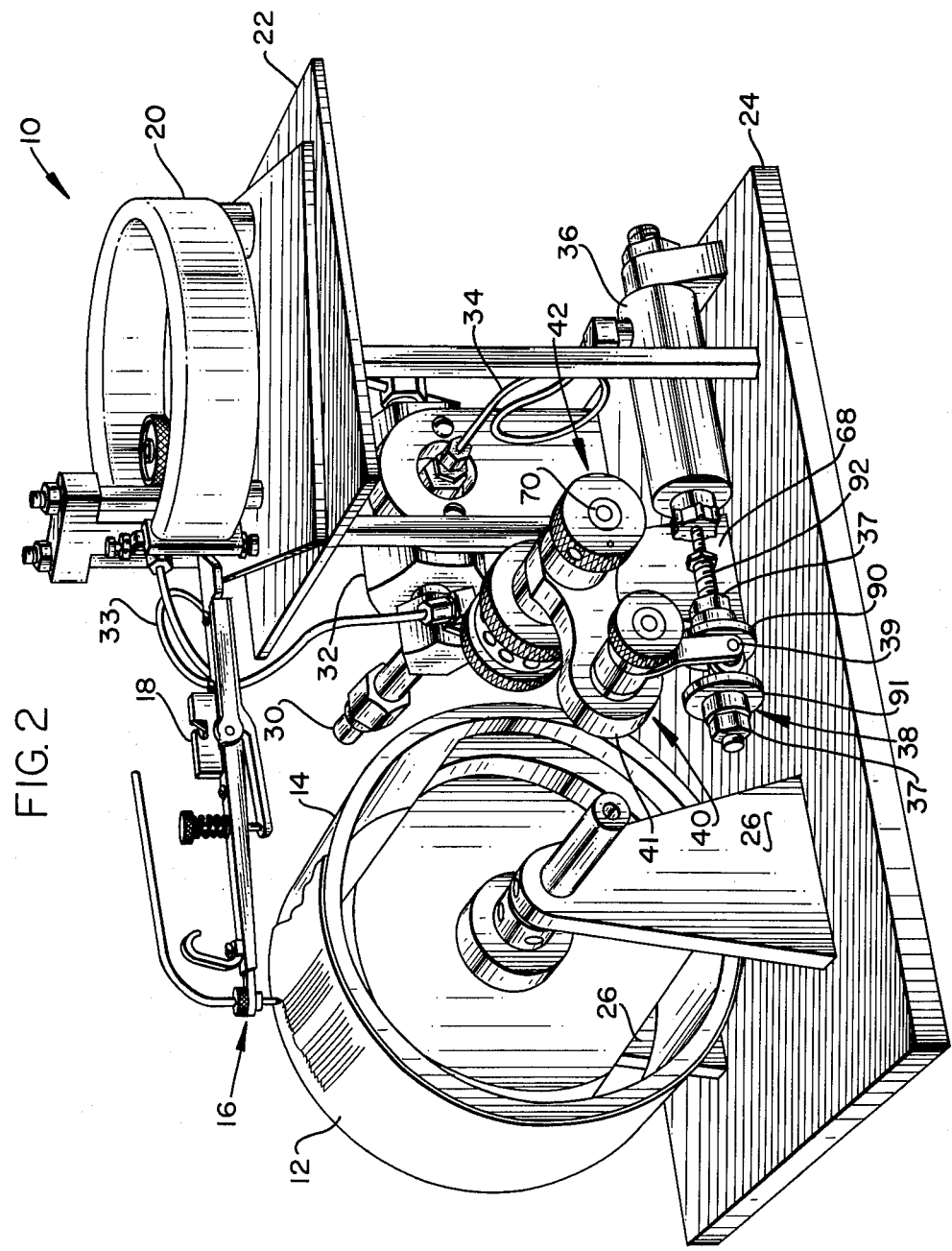
FIG. 2 is a perspective view which discloses the opposed side of the recorder device illustrated in FIG. 1.

In the figures of the drawings there is disclosed a recording apparatus 10 made in accordance with the present invention. As best seen in FIGS. 1 and 2, the apparatus includes a chart means 12 attached in a removable manner to a rotatable drum 14. A scribe means 16 is attached to the pivotal end of a pin arm 18 such that a first pressure responsive means 20 can move the arm to thereby cause the scribe to place indicia in the form of a curve upon the chart means.

The specific pressure responsive means 20 illustrated herein is a bourdon tube mounted to a plate member 22 so that the relative position of the pin 16 can be adjusted respective to the chart and to the drum.

A base plate 24 forms the main support for the entire apparatus. Spaced apart, vertically aligned, drum mount legs 26 supportingly carry opposed ends of the illustrated drum shaft. A one-way Torrington bearing 28 forms on of the journals between the central axis of the drum and the shaft so that the drum can rotate in but one direction of rotation respective to the scribe.

Numeral 30 indicates a fluid connection, sometimes called a quick disconnect, which enables the apparatus of the present invention to be conveniently connected to a fluid pressure source which is to be monitored and recorded. A dampener 32 enables adjustment of the rate of response of movement of the drum, as will be explained in greater detail later on. Hollow fluid conducting tube 33 is directly connected between the pressure source 30 and the bourdon tube. Pressure tube 34 is connected from the downstream side of the dampener to a second pressure responsive means 36. The pressure responsive means is connected to move the chart in reproduceable increments of movement each time pressure is effected at 30. The apparatus 36 therefore constitutes a motor and preferably is a piston and cylinder arrangement which reciprocates a piston shaft 37 in response to pressure being effected at 34.

Figure 4:
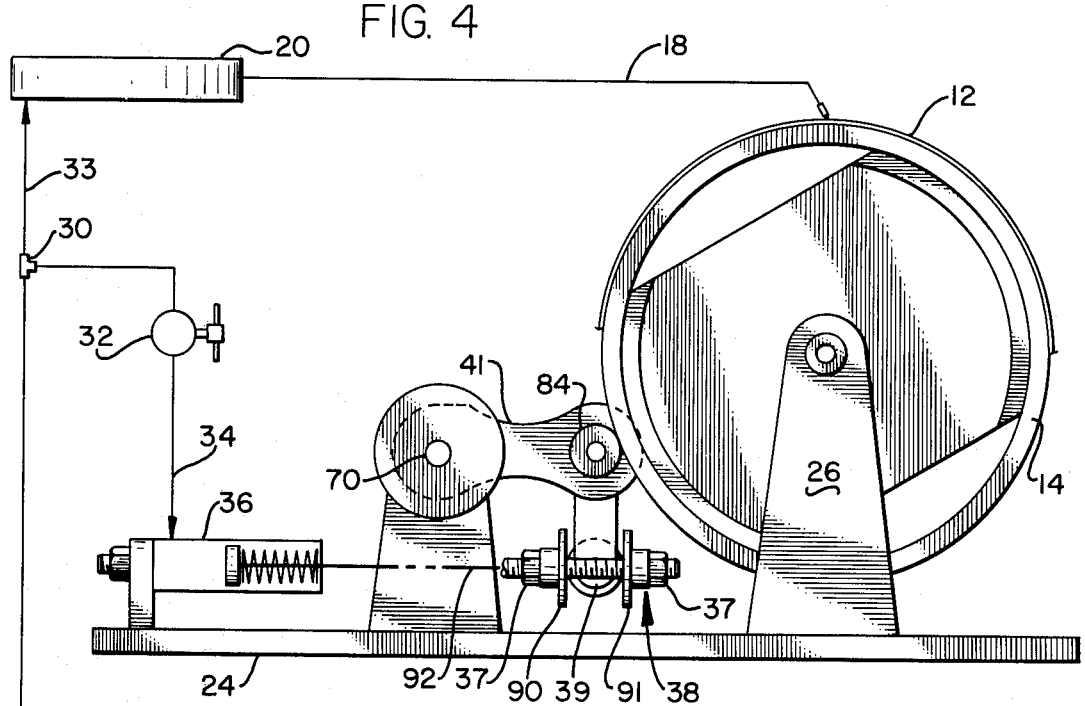
FIG. 4 is a part schematical, part diagrammatical representation of a recording device made in accordance with the present invention.
Figure 5:
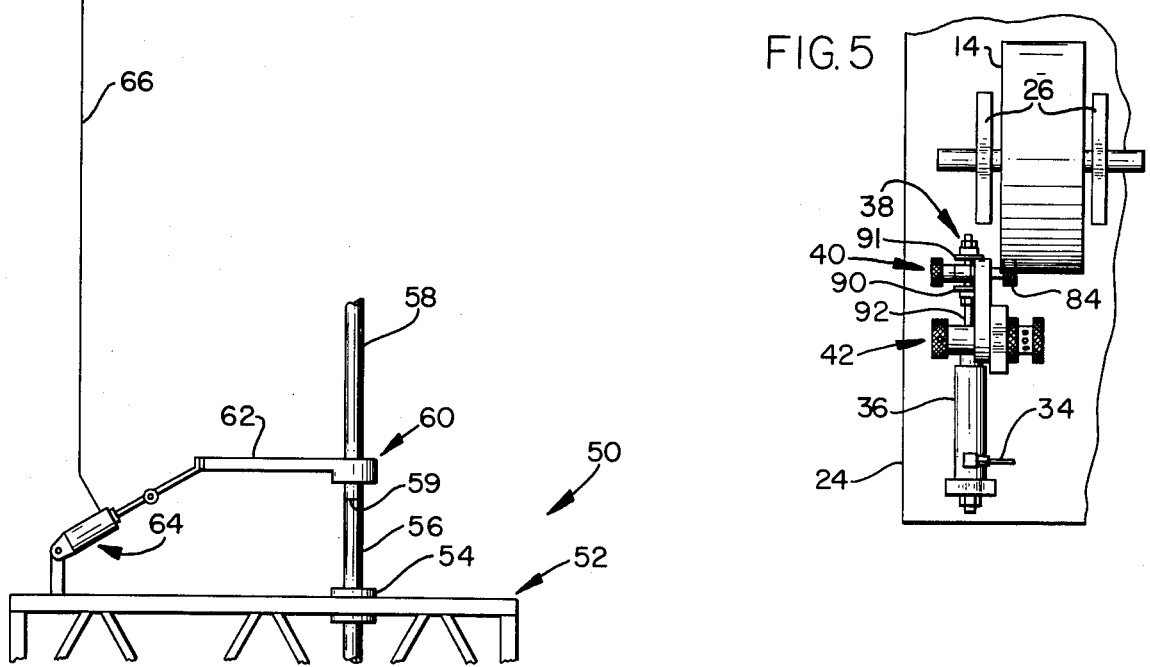
FIG. 5 sets forth a fragmented top plan view of FIG. 4.
Figure 6:
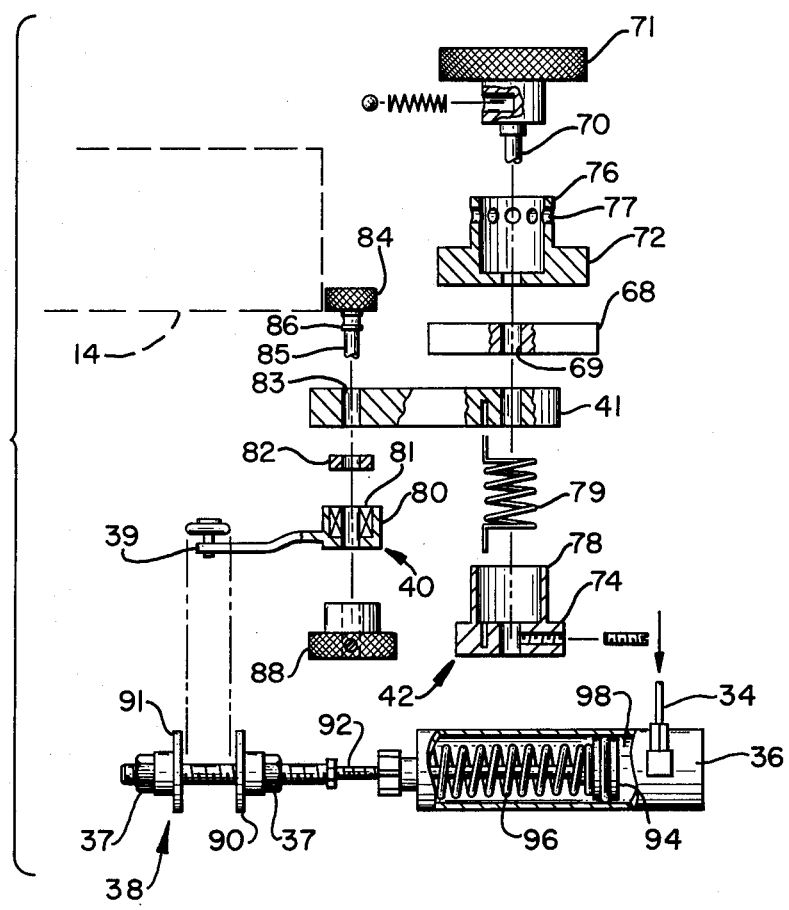
FIG. 6 is an exploded, part cross-sectional view of part of the apparatus disclosed in FIGS. 1 and 2.

As best seen in FIGS. 2, 4, and 6, lost motion coupling 38 is reciprocatingly moved by the piston shaft to thereby impart pivotal movement into a rocker arm 39. The rocker arm is journaled at 40 to a spring loaded, pivoted link 41. The link is resiliently urged by spring loaded means at 42 in such a manner that the link tends to pivot about the member 42 and towards the drum.

Figure 3:
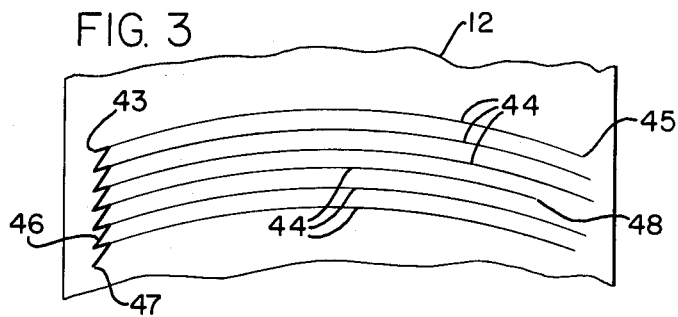
FIG. 3 is a fragmented view of a representation of a chart which has been drawn by the apparatus disclosed in the foregoing figures.

In FIGS. 2 and 3, the chart 12 has indicia formed thereon which is seen to comprise a series of curves having a saw-toothed or Z configuration, at one side 43. As seen in FIG. 3, each of the curves 44 are drawn parallel to one another. The curves terminate at the opposed side 45. The Z's are formed by an inclined line 46. The curves each terminate as seen at 47. The curve 48 is shorter than the curve 45, thereby indicating a lower magnitude of pressure. The curve of FIG. 3 is drawn by the scribe which lies dormant at 43 until the apparatus is actuated by receiving a pressure signal. At this time, a curve 44 is drawn by arcuant movement of the pen arm, with the curve reaching a maximum at 45. The pen next retraces itself along the same previously drawn curve until it reaches a position near 46, whereupon the drum is advanced an increment to form the slant 46. The pin now lies dormant at 47 awaiting the next pressure signal.

FIG. 4 diagrammatically illustrates some of the details of the recorder illustrated in the foregoing figures. In particular, in FIG. 4 there is diagrammatically disclosed a drilling rig 50 having a derrick floor 52 for supporting a rotary table 54. A string of drill pipe 56 extends downhole through the turn-table and into the borehole. A joint of pipe 58 has been connected to the joint 56 by means of a connection effected at 59.

A set of tubing or pipe tongs engages the pipe at 60 to effect the connection. A transducer in the form of a piston and cylinder arrangement 64 is connected between derrick structure and an arm 62 of the tongs so that as the joint 58 is torqued respective to joint 56, a pressure signal is produced by the strain gauge. The torque produced at 64 is proportional to the force employed to effect the connection.

Fluid conductor 66 transmits the pressure signal from 64 to connection 30. Connection 30 is directly connected to the bourdon tube 20 by means of line 33, thereby directly actuating pin arm 18 and placing indicia on chart 12 in accordance with FIG. 3.

Dampener and response adjuster 32 provide the motor 36 with a source of fluid pressure, thereby causing piston arm 37 to extend and thereafter retract as the pressure increases and thereafter decreases in line 66. This action moves the lost motion coupling 38, which in turn actuates the rocker arm 39. This action induces rotational motion into drum 14, as will be better appreciated later on in this disclosure.

As seen illustrated in FIGS. 2 and 6, a mount means 68 is affixed to the baseplate for carrying link member 41 in a pivoted, supported manner thereon. The upstanding mount 68 is apertured at 69 for receiving a shaft 70 therethrough. One end of the shaft is connected to adjustment knob 71. The boss of the knob is radially counterbored for receiving the illustrated spring and ball therewithin.

Cage 72 is affixed by any convenient means to the mount 68. Spring holder 74 is located in opposition to cage member 72. Member 72 includes a skirt member 76 having radially spaced-apart apertures 77 formed therein for receiving the before mentioned ball in seated relationship thereagainst, thereby forming a spring loaded ball and detent assembly which releasably holds member 71 respective to member 68 and 72.

Skirt member 78 houses coil spring 79 therewithin, with the ends of the springs being turned parallel respective to shaft 70 and received within the illustrated, spaced, small counterbores provided therefor. Hence knob 71 is turned to load spring 79 to bias the pivotal end of the link towards the drum.

Rocker arm 40 includes a hub member 80 which is counterbored and provided with a one-way Torrington bearing 81. Spacer 82 stands the rocker arm away from the link 41. The pivoted end of the link is apertured at 83. Drive wheel 84 is connected to shaft 85 with boss 86 being interposed there-between so that the drive wheel 84 is maintained in proper alignment respective to the chart drum and to the link.

Shaft 85 extends through bore 83, spacer 82, the Torrington bearing, and into member 88 so that the drive wheel of the assembled apparatus can be advanced in only one direction as the rocker arm 40 is rocked about shaft 85. Hence, the Torrington bearing forms a one-way clutch assembly which converts intermittent reciprocal motion of the motor into rotational motion. The lost motion coupling 38 is comprised of spaced disks 90 and 91 which are adjustably attached to a shaft extension 92 by means of the illustrated adjustment means.

The motor cylinder has a piston 94 reciprocatingly received therein. The piston is spring biased by means of coil spring 96. The spring urges the piston 94 further into the cylinder in opposition to fluid pressure which is effected at 34 and flows into the variable chamber 98. This action forces the piston in an outward direction against the coil spring.

As the expansion chamber 98 fills with fluid, piston 94 is displaced to force shaft 92 to move away from the cylinder. This action causes flange 90 to engage wheel 39 of the link 40, thereby pivoting the link clockwise about shaft 85. The Torrington bearing 81 is in the low friction mode when the link 40 is rotated clockwise and in the high friction mode when the link is rotated counterclockwise. Therefore, the chart drum 14 is not moved by this initial action. Moreover, the Torrington bearing at 28 prevents such reverse movement of the chart drum.

As the pressure signal reaches a maximum and commences to decay, the pressure within the expansion chamber is also reduced, the spring 96 forces piston 94 to retract shaft 92, thereby causing flange 91 to engage wheel 39, whereupon hub member 40 rotates counterclockwise. In this mode, the Torrington bearing is in the high friction configuration; and accordingly, shaft 85 is rotated an increment dependent upon the spaced-apart distance between flanges 90 and 91 and the stroke of the piston. This action causes drive wheel 84 to move the surface of the drum an amount corresponding to the foregoing.

In operation, the apparatus of this invention is connected to a suitable signal. The signal is in the form of a pressure which increases to a maximum and thereafter decreases to a minimum, such as may be produced by the hydraulic cylinder and piston arrangement seen at 64 in FIG. 4.

The apparatus can be used to advantage to monitor pipe testing apparatus wherein joints of pipe are pressure tested. In this instance, the recorder apparatus 10 is directly connected to the source of pressure used in subjecting the pipe to the test. This expedient provides a record of the number of joints of pipe tested, as well as the pressure value of the test.

The apparatus 10 can be housed in a suitable container for protection, with the lines 66 being connected between the pressure source to be monitored and the recorder apparatus.

The joints of pipe 56 and 58 are screwed together by holding the pipe 58 with the tongs 60, while turn-table 54 rotates pipe 56. The resultant force of the imparted torque is effected on the strain gauge 64. The pressure signal generated by the piston and cylinder of the strain gauge provides the before mentioned signal at 66.

The bourdon tube immediately senses the pressure and moves pin 18 a corresponding amount to draw curve 44. The motor 36 is also actuated by the pressure signal; however, the movement of the chart drum is delayed until toward the end of the pressure signal in order to provide the remainder of the curve, namely the diagonal 46. Hence, each pressure signal is measured and recorded as a curve comprised of one arc 44 and one diagonal 46. The pin rests at the end of diagonal 46, which is the position indicated by the numeral 47, until another signal is received.

The configuration of the diagonal may be modified by adjusting the spaced distance of flanges 90 and 91. The drum is advanced one increment each time the piston 98 is returned by the action of the spring 96. Hence, the pressure signal must decay in order that the spring force may exceed the pressure force at 98, in order for the drum to rotate and have indicia placed thereon.

The two Torrington bearings are arranged respective to one another such that the chart drum can only rotate in one direction as indicated, and such that the drive shaft 85 is rotated by the rocker arm only upon the piston being retracted into the cylinder.

The drum is preferably made of aluminum, while drive wheel 84 is made of steel with a knurled face formed thereon for high friction engagement.

I claim:

1. Recorder apparatus comprising a cylindrical chart means, means mounting said cylindrical chart means for rotation in only one direction about the central axis thereof; a scribe means positioned to place indicia on said chart means upon occurrence of relative movement between said chart and said scribe means;
    a first pressure responsive means connected to move said scribe means in one plane along said chart to form indicia related to a curve, with the length of the curve being proportional to the magnitude of pressure effected upon said pressure responsive means;
    a second pressure responsive means, including a fluid motor, connected to move said chart means one increment of travel in another direction respective to said scribe means, with the increment of travel being constant for each succeeding pressure signal received by the first pressure responsive means so that the chart is advanced one increment for each cycle of the scribe; and, means connecting said first and second pressure responsive means to a pressure signal in such a manner that said scribe moves across said chart to record the magnitude of pressure and thereafter said chart advances one increment of movement so that each measurement of pressure is distinct from the other.

2. The recorder apparatus of claim 1 wherein said second fluid motor includes a cylinder and piston which reciprocatingly cooperate together to form a variable chamber, a flow conduit connecting said variable chamber to said pressure signal;
    said second pressure responsive means includes means by which reciprocal movement of said piston is used to advance said cylinder one increment of rotation.

3. The recorder apparatus of claim 2 wherein the last said means includes a lost motion coupling, a rocker arm, a shaft a drive wheel;
    said lost motion coupling being connected to said piston, said rocker arm being pivotally mounted to said shaft and connected to be pivotally moved by said lost motion coupling, said drive wheel being affixed to said shaft, a second clutch means by which said rocker arm is connected to said shaft such that pivotal motion of said rocker arm rotatably moves said shaft;
    said drive wheel being connected to drive said chart drum.

4. The apparatus of claim 3 wherein said second pressure responsive means is connected to said signal by a dampener device which controls the rate of fluid flow from said signal into the variable chamber of said cylinder.

5. The recorder apparatus of claim 1 wherein said cylindrical chart means includes a drum having a chart mounted thereon,;
    said second pressure responsive means includes a cylinder, piston, drive wheel, rocker arm, lost motion coupling and a clutch means;
    said piston being reciprocatingly received within said cylinder; said drive wheel being connected to rotate said drum; said rocker arm being connected to said drive wheel by said clutch means for rotation in only one direction; means by which said piston actuates said lost motion coupling and said lost motion coupling rotates said drive wheel.

6. The recorder apparatus of claim 5 wherein said second pressure responsive means is connected to said signal by a dampener device which controls the rate of fluid flow from said signal into the variable chamber of said cylinder.

7. A pressure actuated recorder device for measuring and recording the number of connections and the torque of each said connection required to make up a string of tubular members;
    said recorder device comprising a support base, a chart drum including a chart means rotatably mounted to said base, a pressure sensor mounted to said base, a scribe means connected to be moved by said pressure sensor such that indicia in the form of a curve is placed on said chart means in response to a varying pressure signal causing the scribe to move;
    a fluid actuated motor having an expansible chamber which includes a movable wall, a drive wheel connected to drive said chart drum, linkage means connected to said wall and said drive wheel for causing said wheel to rotate in one direction responsive to movement of said wall in one direction, clutch means by which opposed wall movement disengages said drive wheel from said motor so that movement of the wall in only one direction imparts rotation into the chart drum;

another clutch means connected to permit said drum to rotate in a first direction and to preclude rotation thereof in a second direction; whereby said scribe moves across said chart to record the magnitude of pressure and thereafter said chart advances one increment of movement so that each measurement of pressure is distinct from the other.

8. The recorder of claim 7 wherein said chart means is a cylinder, means mounting said cylinder for rotation in only one direction about the central axis thereof;

said second pressure responsive means being a cylinder and piston which reciprocatingly cooperate together to form a variable chamber, a flow conduit connecting said variable chamber to said pressure signal;

means by which reciprocal movement of said piston is used to advance said cylinder one increment of rotation.

9. The recorder of claim 8 wherein the last said means includes a lost motion coupling, a shaft, a rocker arm, a drive wheel;

said lost motion coupling being connected to said piston, said rocker arm being pivotally mounted to said shaft and connected to be pivotally moved by said lost motion coupling, said drive wheel being affixed to said shaft, said rocker arm is connected to said shaft by the first recited clutch means such that pivotal motion of said rocker arm rotatably moves said shaft.

10. The recorder of claim 9 wherein said second pressure responsive means is connected to said signal by a dampener device which controls the rate of fluid flow from said signal into the variable chamber of said cylinder.

11. The recorder apparatus of claim 7 wherein said chart means includes a cylinder having a chart mounted thereon;

said second pressure responsive means includes a cylinder, piston, rocker arm, and a lost motion coupling;

said piston being reciprocatingly received within said cylinder; said rocker arm being connected to said drive wheel by said first recited clutch for rotation in only one direction; means by which said piston actuates said lost motion coupling and said lost motion coupling rotates said drive wheel.

12. The recorder apparatus of claim 11 wherein said second pressure responsive means is connected to said signal by a dampener device which controls the rate of fluid flow from said signal into the variable chamber of said cylinder.

* * * * *